(12) United States Patent
Hamzehi et al.

(10) Patent No.: US 12,140,075 B2
(45) Date of Patent: *Nov. 12, 2024

(54) METHODS AND SYSTEMS FOR OPERATING AN AIRCRAFT ENGINE

(71) Applicant: PRATT & WHITNEY CANADA CORP., Longueuil (CA)

(72) Inventors: Kasra Hamzehi, Richmond Hill (CA); Kulbir Singh Madhok, Montréal (CA); Eric Belanger, Boucherville (CA); Christian Duchesne, Boucherville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 385 days.

This patent is subject to a terminal disclaimer.

(21) Appl. No.: 17/546,179

(22) Filed: Dec. 9, 2021

(65) Prior Publication Data
US 2023/0184166 A1 Jun. 15, 2023

(51) Int. Cl.
| | | |
|---|---|---|
| *G05B 23/02* | (2006.01) | |
| *B64D 45/00* | (2006.01) | |
| *F01M 11/10* | (2006.01) | |
| *F02C 7/06* | (2006.01) | |
| *F02C 9/00* | (2006.01) | |
| *G07C 5/00* | (2006.01) | |

(52) U.S. Cl.
CPC .............. *F02C 7/06* (2013.01); *F01M 11/10* (2013.01); *F02C 9/00* (2013.01); *G05B 23/0259* (2013.01); *G05B 23/0283* (2013.01); *G07C 5/006* (2013.01); *B64D 2045/0085* (2013.01); *F01M 2011/14* (2013.01); *F05D 2260/98* (2013.01); *F05D 2270/114* (2013.01); *F05D 2270/301* (2013.01)

(58) Field of Classification Search
CPC ....... F01M 11/10; F01M 2011/14; F02C 9/00; G05B 23/0259; G05B 23/0283; G07C 5/006; B64D 2045/0085; F05D 2270/114; F05D 2270/301
USPC .............. 701/31.7, 29.1–29.2, 29.9, 30.1, 54
See application file for complete search history.

(56) References Cited

U.S. PATENT DOCUMENTS

| | | | |
|---|---|---|---|
| 5,033,010 A | * | 7/1991 | Lawrence .......... G05B 23/0264 346/33 TP |
| 10,557,418 B2 | | 2/2020 | Karpman et al. |
| (Continued) | | | |

OTHER PUBLICATIONS

Zhen pan et al., A Model of Aircraft Health Monitoring and Fault Diagnosis based on Beacon Exception Analysis, 2019 IEEE, pp. 185-191.*

*Primary Examiner* — Manglesh M Patel
(74) *Attorney, Agent, or Firm* — Norton Rose Fulbright Canada LLP

(57) ABSTRACT

Methods and systems for operating an aircraft engine. A health parameter for the aircraft engine is monitored by a health evaluation device, the health parameter received from a first instrument. the health parameter is compared, by the health evaluation device, to a predetermined threshold. When the health parameter reaches the predetermined threshold, the health evaluation device wirelessly transmits a fault signal to a controller associated with the aircraft engine to elicit a health response from the controller, the fault signal containing at least two mutually-exclusive fault codes associated with an operating condition of the aircraft engine monitored by a second instrument.

20 Claims, 4 Drawing Sheets

(56) References Cited

U.S. PATENT DOCUMENTS

| | | |
|---|---|---|
| 10,677,170 B2 | 6/2020 | Patry et al. |
| 11,498,695 B2* | 11/2022 | Lee ...................... G07C 5/0808 |
| 11,769,352 B2* | 9/2023 | Dos Santos ............ G06Q 10/08 |
| | | 701/29.1 |
| 2005/0096873 A1* | 5/2005 | Klein ................ G05B 23/0275 |
| | | 702/184 |
| 2006/0015777 A1* | 1/2006 | Loda .................... G07C 5/0808 |
| | | 714/38.14 |
| 2008/0091715 A1* | 4/2008 | Yan ...................... G06F 11/2263 |
| 2010/0168952 A1* | 7/2010 | Falkmann ................. F02C 9/00 |
| | | 701/31.4 |
| 2013/0166135 A1* | 6/2013 | Dunsdon .............. G07C 5/0808 |
| | | 701/29.3 |
| 2013/0204507 A1* | 8/2013 | Vieira .................... G06F 17/00 |
| | | 701/100 |
| 2014/0020460 A1* | 1/2014 | Ertz ........................ F01D 21/12 |
| | | 73/114.55 |
| 2015/0193993 A1* | 7/2015 | Rood .................. G07C 5/0816 |
| | | 701/51 |
| 2016/0049021 A1* | 2/2016 | Duarte ................ G01R 31/008 |
| | | 701/3 |
| 2018/0079520 A1* | 3/2018 | Joshi ........................ F02C 9/28 |
| 2018/0293810 A1* | 10/2018 | Griffith ................. G07C 5/085 |
| 2020/0047914 A1* | 2/2020 | Martin ................. G07C 5/0825 |
| 2020/0080497 A1* | 3/2020 | Syed ........................ F02C 9/28 |
| 2020/0398993 A1* | 12/2020 | Drolet ..................... G01K 13/02 |
| 2021/0052999 A1* | 2/2021 | Niculescu ............ B01D 35/005 |
| 2021/0078723 A1* | 3/2021 | Li .......................... B64D 41/00 |
| 2021/0086916 A1* | 3/2021 | Carvalho Do Lago ...................... |
| | | G05B 23/0283 |
| 2021/0140338 A1 | 5/2021 | Girard et al. |
| 2023/0182914 A1* | 6/2023 | Hamzehi ................ F01D 25/04 |
| | | 701/3 |

* cited by examiner

METHODS AND SYSTEMS FOR OPERATING AN AIRCRAFT ENGINE

TECHNICAL FIELD

The present disclosure relates generally to aircraft engines and, more particularly, to health monitoring of aircraft engines.

BACKGROUND

During operation, an engine outputs energy in a variety of ways: though the primary goal can be to cause the rotation of a shaft or other element, the engine also creates sound, heat, and vibrations, all of which are forms of waste energy, and which can damage and/or degrade the performance of the engine. Operation parameters for the engine can be monitored, including waste-energy-related parameters, to determine whether engine failure or a need for engine maintenance is imminent.

However, some gas turbine engines may not be configured for measuring and/or analyzing certain operation parameters of the engine.

Therefore, improvements are needed.

SUMMARY

In one aspect, there is provided a method for operating an aircraft engine, comprising: monitoring, by a health evaluation device, a health parameter for the aircraft engine, the health parameter received from a first instrument; comparing, by the health evaluation device, the health parameter to a predetermined threshold; when the health parameter reaches the predetermined threshold, wirelessly transmitting a fault signal from the health evaluation device to a controller associated with the aircraft engine to elicit a health response from the controller, the fault signal containing at least two mutually-exclusive fault codes associated with an operating condition of the aircraft engine monitored by a second instrument.

In another aspect, there is provided a system for operating an aircraft engine, comprising: a first instrument coupled to the aircraft engine and operable to monitor a health parameter of the aircraft engine; a second instrument coupled to the aircraft engine and operable to generate an operation parameter signal indicative of an operating condition of the aircraft engine; a communication link coupling the second instrument to a controller associated with the aircraft engine to provide the operation parameter signal to the controller; and a health evaluation device communicatively coupled to the first instrument and to the controller, the health evaluation device operable, in response to detecting that the health parameter reaches a predetermined threshold, to wirelessly transmit a fault signal to the controller to elicit a health response from the controller, the fault signal containing at least two mutually-exclusive fault codes associated with the operation condition.

BRIEF DESCRIPTION OF THE DRAWINGS

Reference is now made to the accompanying figures in which.

DETAILED DESCRIPTION

Figure 1:
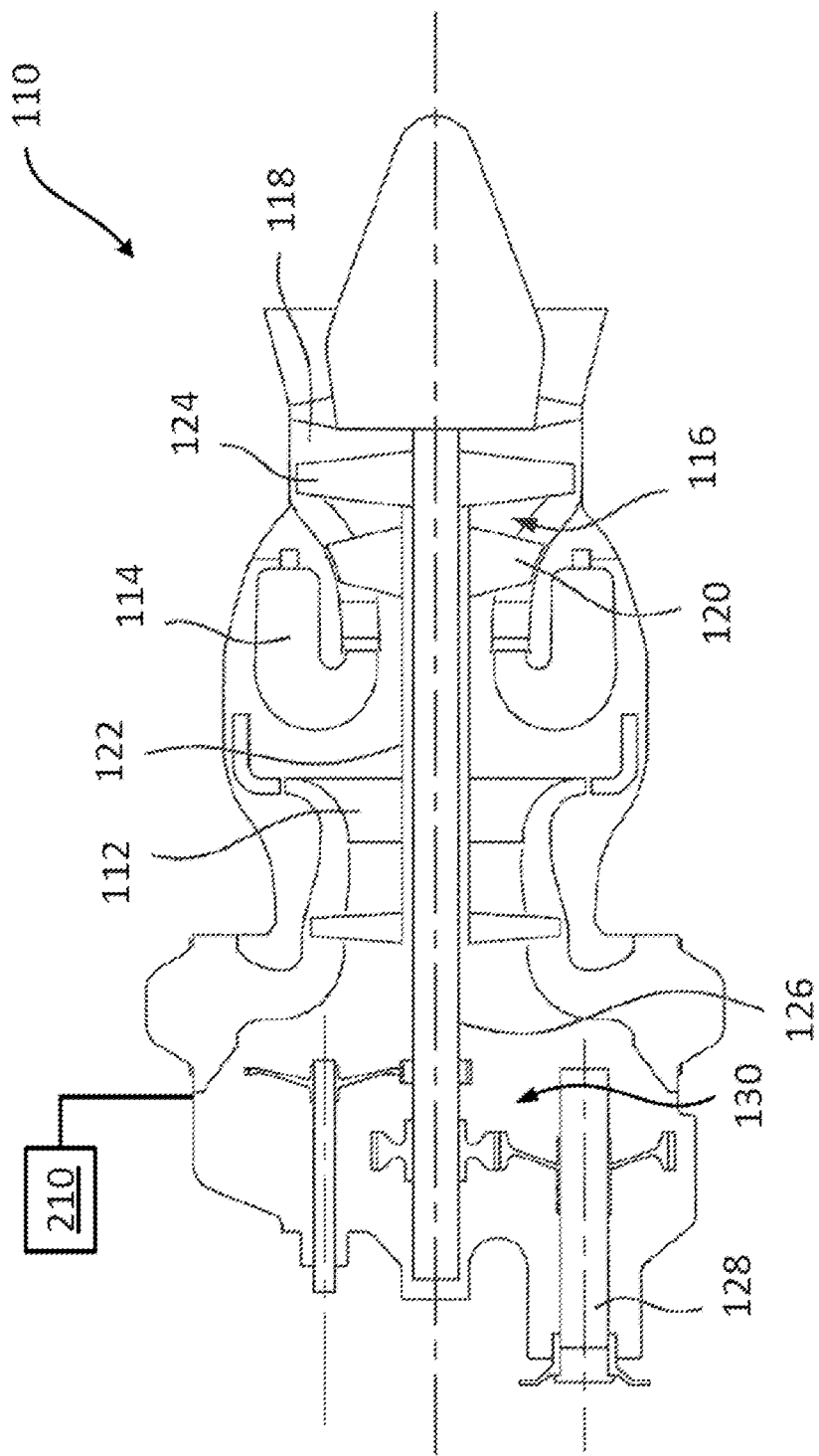
FIG. 1 is a schematic cross sectional view of an example gas turbine engine.

FIG. 1 illustrates a gas turbine engine 110. In some embodiments, the engine 110 is used for of a type preferably provided for use in subsonic flight, generally comprising in serial flow communication, a compressor section 112 for pressurizing the air, a combustor 114 in which the compressed air is mixed with fuel and ignited for generating an annular stream of hot combustion gases, and a turbine section 116 for extracting energy from the combustion gases. The combustion gases flowing out of the combustor 114 circulate through the turbine section 116 and are expelled through an exhaust duct 118. The turbine section 116 includes a compressor turbine 120 in driving engagement with the compressor section 112 through a high pressure shaft 122, and a power turbine 124 in driving engagement with a power shaft 126. The power shaft 126 is in driving engagement with an output shaft 128 through a gearbox 130, which may be a reduction gearbox. The engine 110 may be equipped with one or more sensors, which may measure pressure, temperature, speed, angular velocity, torque, and the like. A controller 210 can be coupled to the engine 110 for acquiring information from the sensors and/or from an operator via various inputs, and for controlling operation of the engine 110 based thereon. The controller 210 can be a full-authority digital engine controls (FADEC) or other similar device, including electronic engine control (EEC), engine control unit (ECU), and the like.

Although illustrated as a turboshaft engine, the engine 110 may alternatively be another type of aircraft engine, for example a turbofan engine, also generally comprising, in serial flow communication, a compressor section, a combustor, and a turbine section, and a fan through which ambient air is propelled. A turboprop engine may also apply. In addition, although the sensor-related applications discussed herein pertain primarily to the engine 110 and flight applications, it should be understood that other uses, such as industrial, commercial, or the like, may apply. For example, the techniques described herein could be applied to other types of machines or devices which experience vibration in one form or another.

In operation, vibrations can be produced by one or more rotating components of the engine 110 which affect the engine 110 itself and other components to which the engine 110 is coupled. In embodiments in which the engine 110 is configured for causing rotation of a propeller, which may be external to the engine 110, the propeller can also cause vibrations which affect the engine 110. Generally speaking, the vibrations produced by the engine 110 are a result of the rotational motion of various components within the engine 110, including the shafts 122, 126, 128. Although a certain degree of vibration is expected, and indeed normal, levels of vibration which exceed certain thresholds can cause damage to the engine 110, or to other components to which the engine 110 is coupled.

In some cases, the engine 110 is not originally provided with any dedicated vibration sensor, whether coupled to the engine 110 itself or coupled to other elements (e.g., a propeller). Also, in some cases, the controller 210 is configured for interfacing with a variety of sensors (which can include temperature sensors, pressure sensors, fluid level sensors, speed sensors, and the like), but is not originally configured for interfacing with any type of dedicated vibration sensor. Thus, even if a vibration sensor were to be added to the engine 110, the controller 210 may not be capable of processing any information provided by the vibration sensor, without requiring a complete retrofit of the controller 210 and possibly any associated sensor suite.

In some cases, for instance where the engine is used in an aircraft, the engine 110 may pass through various certifications before being designated as fit for flight. As such, any substantial modifications to its hardware or software may require re-certification.

Figure 2:
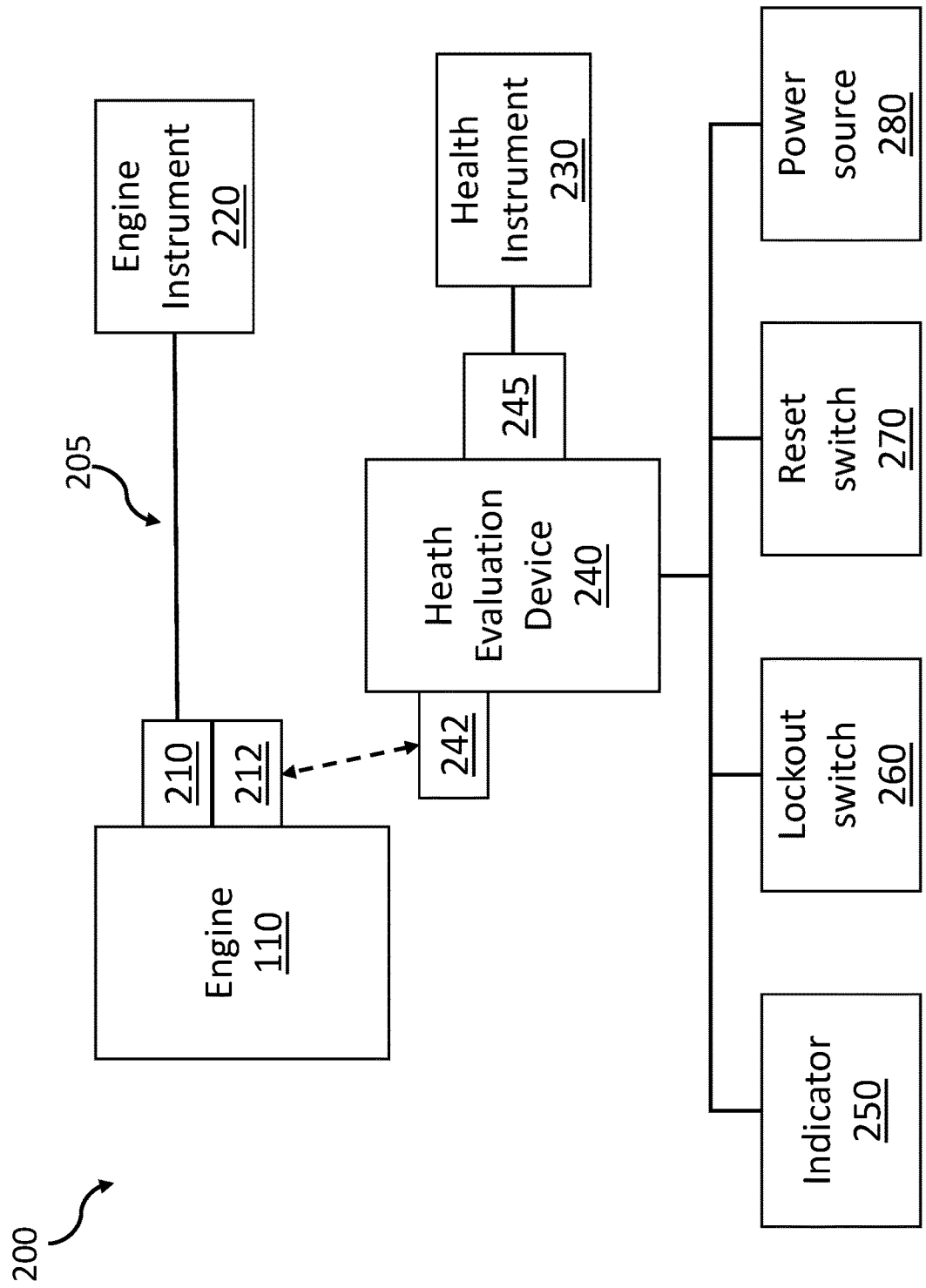
FIG. 2 is a block diagram of an example engine health monitoring system.

With reference to FIG. 2, there is illustrated a system 200 for monitoring the health of a gas turbine engine, for instance the engine 110. As illustrated in FIG. 2, the engine 110 is coupled to the controller 210. It should be noted that although FIG. 2 illustrates the controller 210 as being a separate entity from the engine 110, in some embodiments the controller 210 may be integrated with the engine 110. As will be discussed in further detail below, the system 200 comprises elements included with the engine 110, i.e. that would have been certified with the engine 110 as part of a certification program, and elements that may be retrofitted to the engine 110 in a minimally-invasive fashion. Other installations may be contemplated, for instance the engine 110 being certified with elements of system 200 being pre-installed.

Coupled to the controller 210 is an engine instrument 220, which is configured for providing the controller 210 with an operation parameter signal indicative of an operating condition of the engine 110. The operation parameter signal may comprise a value of an operation parameter of the engine 110. In some embodiments, the engine instrument 220 is a sensor, for instance a pressure sensor, an oil pressure sensor, a fluid level sensor, a temperature sensor, a speed sensor, or the like, and the operation condition (or operation parameter) can be an ambient air pressure, an oil reservoir pressure, a fuel reservoir level, an engine operating temperature, an output shaft speed, and the like. In some other embodiments, the engine instrument 220 is a so-called "soft sensor" (sometimes referred to as a "virtual sensor"), which refers to an output of a controller, instrument, or other device, and can be based on values from one or more other sensors. Still other embodiments are considered. For example, in some cases, the engine instrument 220 is part of the engine 110, or part of the controller 210.

The controller 210 and the engine instrument 220 are coupled to one another via a communication link 205, which may comprise any suitable communication means. The communication link 205 can be of any suitable length, and can be composed of any suitable number of wired networking elements. In some embodiments, the communication link 205 consists of one or more electrical wires. For example, the communication link 205 includes part or all of an engine harness of the engine 110. The engine harness can include various wires, cables, and other electrical connectors and transmission devices for carrying electrical power and signals (whether analog or digital) between the engine 110, the controller 210, and other elements, including the engine instrument 220. In one embodiment, the controller 210, engine instrument 220 and communication link 205 are existing components of the engine 110 that may be included in a certification program of the engine.

With continued reference to FIG. 2, the system 200 also includes a health instrument 230 and a health evaluation device 240 that may be retrofitted to the engine 110 in a minimally-invasive fashion. For example, the health evaluation device 240 can be integrated into the engine harness for the engine 110 via a health evaluation harness 245. The health instrument 230 is coupled to the health evaluation device 240 (using any suitable means), and is configured for measuring a health parameter for the engine 110. As will be discussed in further detail below, the health evaluation device 240 is configured for generating a signal that is wirelessly transmitted to the controller 210 to modify or replace the operation parameter signal from the engine instrument 220 at the controller 210 when the health parameter provided by the health instrument 230 has reached or exceeded a predetermined health threshold. When the health parameter is below the predetermined health threshold, the health evaluation device 240 does not communicate with the controller 210, and the operation parameter signal from the engine instrument 220 is received at the controller 210 via communication link 205, without interruption, and interpreted by the controller 210. The wirelessly transmitted signal (also referred to herein as a "fault signal") contains at least two mutually-exclusive fault codes associated with the operating condition monitored by the engine instrument 220, as will be discussed in further detail below.

In some embodiments, the health instrument 230 is an accelerometer configured for measuring a level of vibration within, or in the vicinity of, the engine 110. In some other embodiments, the health instrument 230 is configured for measuring another health parameter for the engine 110. For instance, the health instrument 230 can measure an ambient pressure in a vicinity of the engine 110, an in-engine air pressure at one or more locations within the engine 110, an ambient temperature in the vicinity of the engine 110, an internal temperature at one or more locations within the engine 110, a noise level at one or more locations within the engine 110, a strain level for one or more components of the engine 110, a speed, angular velocity, chip detection readings, and/or acceleration for one or more components of the engine 110, and the like. In various cases, the health instrument 230 may be configured for detecting high or low oil pressure readings, high or low oil temperature readings, high or low oil level readings, high or low fuel pressure readings, high or low fuel temperature readings, high or low air pressure readings (for instance at the inlet of the combustor 114), and chip detection readings (for instance due to gear fragments chipping or breaking off) at various locations in the engine 110. The health parameter can be any suitable value indicative of an operating condition of the engine 110 which is indicative of a health state of the engine 110. In various cases, the health instrument 230 may be configured for measuring or detecting a health parameter that is not already being monitored or capable of being monitored by the controller 210.

The health evaluation device 240 is coupled to the health instrument 230 to receive therefrom the health parameter. For example, the health evaluation device 240 receives data indicative of the level of vibration (the health parameter) detected by a vibration sensor (the health instrument 230). In another example, the health evaluation device 240 receives data indicative of a mode of vibration detected by the health instrument 230, or some other indication of the type of vibrations detected by the health instrument 230. In other embodiments, the health evaluation device 240 obtains other data from the health instrument 230, which is indicative of the health parameter.

As depicted in FIG. 2, the health evaluation device 240 includes a wireless transmitter 242 operable to emit a wireless signal to the controller 210, which may receive and interpret said wireless signal at a wireless receiver 212. Any suitable wireless transmitter and wireless receiver may apply. For instance, wireless transmitter 242 and wireless receiver 212 may communicate over WiFi, 5G mmWave, or Bluetooth. Other wireless protocols may be contemplated as well. As such, the health evaluation device 240 receives data from the health instrument 230 as an input, and may output one or more wireless signals to the controller 210 via wireless transmitter 242. In other embodiments, the health evaluation device 240 may include more inputs and/or outputs, as appropriate. In other embodiments, the health evaluation device 240 may wirelessly communicate with the controller 210 in other ways.

In various embodiments where the health instrument 230 is configured to measure vibrations, the health evaluation device 240 may be referred to as an engine vibration monitoring unit (EVMU). The EVMU may be provided with an EVMU harness 245 that may be retrofitted in the engine 110.

The health evaluation device 240 is configured for monitoring the health parameter obtained from the health instrument 230. In some embodiments, the health evaluation device 240 substantially continuously monitors the health parameter. In some other embodiments, the health evaluation device 240 monitors the health parameter periodically, for instance once every few minutes, once every few seconds, several times per second, or the like. In various cases, the health evaluation device 240 may be configured for assessing the data received from the health instrument 230, using average, RMS, or peak-hold values. Other assessment means may be contemplated.

The health evaluation device 240 is also configured for comparing the health parameter to a predetermined health threshold associated with the health parameter. The health threshold can be set based on a number of factors, for instance environmental factors, or based on an overall health level of the engine 110. Such environmental factors may include, but are not limited to, an ambient temperature, humidity level, or level of particles such as sand or dust in the air. For instance, the environment through which an aircraft is flying, such as the level of sand or dust in the air, may affect the level of vibration that the engine 110 may tolerate. In the case of a vibration level, the health threshold is a vibration threshold that can be set as a maximum rate of vibration, a maximum level of displacement for the engine 110 along any suitable axis, or the like. In cases in which the health parameter is a different value, the health evaluation device can use a different health threshold. The health threshold can be based on established regulations, for instance instituted by a manufacturer or a regulatory body, or the like. Various means for setting the health threshold may be contemplated. For instance, the health evaluation device 240 may include a user interface for increasing or decreasing the health threshold based on a variety of factors. Analog and/or digital controls for the user interface may be contemplated. In some embodiments, the health evaluation device 240 may be configured for varying the predetermined health threshold based on, for instance, environmental factors. Other means for adjusting the predetermined health threshold may be contemplated.

In some cases, the health threshold may be complemented by a time factor. For instance, the health parameter may be required to reach or exceed a predetermined health threshold for a minimum duration of time before the health evaluation device 240 transmits a signal indicative of a fault. For instance in the case of a vibration level being monitored, a level of at least 10G of vibration continuously sustained for at least 2 minutes may result in a fault being triggered. By taking time into consideration, false positives may be avoided, for instance due to an isolated incident during a flight. Other factors may be considered in neglecting certain data from the health instrument 230. For instance, when an engine 110 is cold during startup, it may be susceptible to higher than usual vibrations. As such, the health evaluation device 240 may be configured, for instance via the user interface, to ignore data from a predetermined period of time, for instance for the first 10 or 15 minutes after startup. When a predetermined threshold is set, the health evaluation device 240 may be configured to allow a certain tolerance, for instance based on a predetermined or adjustable percentage in a plus or minus direction. The degree of a given tolerance may depend on, for instance, the given parameter being measured by the health instrument 230.

When the health parameter is beyond the health threshold, the health evaluation device 240 is configured for generating and wirelessly transmitting a new signal to the controller 210, for instance via wireless transmitter 242 and wireless receiver 212. The transmitted signal is operable to replace or supplant the operation parameter signal received at the controller 210 from the engine instrument 220 via the communication link 205 and contains at least two mutually-exclusive fault codes associated with the operation parameter to elicit a health response from the controller 210. In other embodiments, the health evaluation device 240 may be configured for modifying the operation parameter signal received from the engine instrument 220 at the controller 210 with the at least two mutually-exclusive fault codes rather than replacing the operation parameter signal from the engine instrument 220 with a new signal.

In some cases, the health evaluation device 240 may function in parallel with the engine instrument 220. For instance, the engine instrument 220 may transmit a fault code to the controller 210 based on its measuring of an engine parameter. If the health evaluation device 240 determines that the parameter being measured by the health instrument 230 meets or exceeds the predetermined health threshold, it wirelessly transmits a signal to the controller 210 containing the at least two mutually-exclusive fault codes associated with the parameter being measured by the engine instrument 220. The controller 210 may first register the fault at the engine instrument 220, then register the at least two mutually-exclusive fault codes received from the health evaluation device 240 (or vice versa). A user (such as the pilot) may thus consult a log (or view the faults in real time) and perform the necessary corrective measures accordingly.

In other words, the signal transmitted by the health evaluation device 240 contains at least two fault codes associated with the operation parameter. Individually, these at least two fault codes may be ordinarily provided by the engine instrument 220 to alert the controller 210 to an issue relating to the operating condition being monitored by the engine instrument 220. However, the mutually-exclusive nature of the at least two fault codes brings attention to the fact that the issue is not related to the operating condition monitored by the engine instrument 220, but is in fact related to the health parameter being monitored by the health instrument 230. By "mutually-exclusive", it is understood that, under normal operation of the engine 110, it would be highly unlikely, or under very rare circumstances, that the at least two fault codes would occur simultaneously. In some cases, depending on the nature of the parameter(s) being measured, the simultaneous occurrence of the at least two mutually-exclusive fault codes may be close to, or even, impossible. Various examples of mutually-exclusive fault codes may be contemplated, for instance based on the operating condition being monitored by the engine instrument 220, as will be discussed in further detail below. The received at least two fault codes may additionally cause the controller 210 to adjust the operation of the engine 110 in some fashion, in order to preserve or improve the health of the engine 110.

As shown in FIG. 2, the health evaluation device 240 may additionally be operably connected to an indicator 250, a lockout switch 260, and a reset switch 270. The indicator 250 may be a visual indicator such as a light, screen or other display positioned adjacent the health evaluation device 240 and configured to display a status of the health parameter, including whether the predetermined threshold has been reached or exceeded. The indicator 250 may alternatively be au auditory indicator, for instance to sound an alarm if the predetermined threshold has been exceeded. A combined auditory/visual indicator 250 may be provided as well. Other indicator types may be contemplated. The indicator 250 may allow a health issue to be identified, for instance via lights, images or sounds, on the health evaluation device 240 itself. The lockout switch 260 may be provided to allow a user to bypass the health evaluation device 240. For example, the lockout switch 260 may, when activated, prevent the health evaluation device 240 from wirelessly transmitting a signal to the controller 210 despite the health parameter reaching or exceeding the predetermined threshold. In some cases, the lockout switch 260 may be a latching switch, requiring a positive action to deactivate it. In other cases, the lockout switch 260 may include options to set a timer, for instance to allow the health evaluation device 240 to resume its normal functioning after a set amount of time. The reset switch 270 may be provided to unlatch any latched switches or indicated faults associated with the health evaluation device 240 and resume normal operations. Each of the indicator 250, the lockout switch 260 and the reset switch 270 may be integrated with the health evaluation device to facilitate their retrofitted installation in the engine 110.

In some embodiments, the health evaluation device 240 may be provided with its own power source 280. Said power source 280 may provide sufficient power for the health evaluation device 240 to perform the above-described determinations regarding the information received from the health instrument 230, as well as wirelessly transmit the required signal to the controller 210 via wireless transmitter 242. The power source 280 may, in some cases, be a battery. In other cases, the power source 280 may include an external cable providing a direct source of power to the health evaluation device 240 from a different location in the aircraft, for instance an emergency bus. Other power sources for the health evaluation device 240 may be contemplated.

In an exemplary embodiment, the engine instrument 220 is an oil pressure sensor, which reports an oil pressure value to the controller 210. For instance, the oil pressure sensor may be positioned to record oil pressure readings immediately upstream and downstream of an engine oil filter. Other locations within the engine 110 may be contemplated. In one embodiment, the health evaluation device 240 is coupled to a vibration sensor which embodies the health instrument 230, for instance an accelerometer, and monitors a level of vibration within the engine 110. Various locations for the accelerometer throughout the engine 110, such as in gearbox 130 (or other gearboxes within engine 110), may be contemplated. In some cases, the engine 110 may not otherwise be provided with a vibration sensor, and thus controller 210 may not be configured for natively receiving or processing a vibration signal. Thus, when the health evaluation device 240 determines that the level of vibration within the engine 110 is above a predetermined safe vibration threshold, the health evaluation device 240 wirelessly transmits the above-described signal to the controller 210, for instance via wireless transmitter 242. The signal (i.e., fault signal) received at the controller 210 (via wireless receiver 212) may supersede, replace or modify the operation parameter signal that the oil pressure sensor typically provides to the controller 210. In particular, the health evaluation device 240 wirelessly transmits a signal containing at least two mutually-exclusive fault codes associated with the operation parameter, for instance a fault code indicative of a high delta upstream oil pressure and a high delta downstream oil pressure. In some cases, the at least two mutually-exclusive fault codes may be two different fault codes based on the same measurement or reading, for instance a high pressure reading and a low pressure reading from the same pressure sensor, which would never occur under normal operating conditions of the engine 110. As such fault codes would not ordinarily occur simultaneously, a pilot or other operator would understand that the signal received by the controller 210 is not indicative of an issue, error or other problem related to the oil pressure sensor, but rather an issue related to the vibration sensor (or other health instrument 230 operatively connected to health evaluation device 240). In response to wirelessly receiving this signal, the controller 210 may implement a health routine for the engine 110, which can include shutting down the engine 110, reducing a level of fuel flow to the engine 110, or the like. Said health routine may be associated with one or both of the at least two mutually-exclusive fault codes included in the signal sent by the health evaluation device 240. For instance, in some embodiments, one of the at least two mutually-exclusive fault codes may be of a higher priority than the other, to which the controller 210 may implement a corresponding health routine for the engine 110 in response. Other determining means may be contemplated.

By wirelessly transmitting the signal to the controller 210, the health evaluation device 240 may elicit particular responses from the engine 110, by way of the controller 210, based on data obtained from the health instrument 230, which is not regularly available to the controller 210. The health evaluation device 240 provides information obtained by the health instrument 230 to the controller 210 by containing an operation parameter that would normally be provided by the engine instrument 220. In addition, by including at least two mutually-exclusive fault codes in this signal, it may be possible to distinguish between data ordinarily received from the engine instrument 220 and the injected data received from the health evaluation device 240 pertaining to the health instrument 230 and containing the operation parameter. In this fashion, the capabilities of the controller 210 can be augmented without requiring recoding or retrofitting of the controller 210 itself, or of the suite of instruments used by the controller 210. Thus, the health instrument 230, health evaluation device 240 and other associated components, may be retrofitted to a certified engine 110 in a minimally-invasive fashion without requiring the engine 110 to be re-certified.

In some embodiments, the health evaluation device 240 can wirelessly transmit different signals to the controller 210 to elicit different responses from the controller 210. For instance, a first-transmitted signal can elicit an alert-type response from the controller 210, which can result in an alert being raised for an operator of the engine 110, and a second-transmitted signal can elicit an engine shutdown response, or a reduction in engine power output, for instance by reducing a fuel flow to the engine 110. The health evaluation device 240 can compare the health parameter, as obtained from the health instrument 230, against a variety of different health thresholds, and select the signal to transmit based on how the health parameter compares to the different health thresholds. The user interface of the health evaluation device 240 configured for allowing a user to modify the health threshold may be further configured for receiving multiple health thresholds, each corresponding to a different health response to be elicited from the controller 210. In some embodiments, the various selectable signals contain a plurality of groups of mutually-exclusive fault codes that may each elicit different health responses from the controller 210, and the health evaluation device 240 may thus select the applicable signal based on the reached health threshold. Alternatively, or in addition, the system 200 can include multiple health instruments 230, and the health evaluation device 240 can compare a variety of health parameters against one or more associated health thresholds, then select a signal to transmit accordingly.

In some embodiments, the system 200 includes more than one engine instrument 220, and the health evaluation device 240 can transmit signals associated with different engine instruments 220, for instance to raise different health responses from the controller 210 associated with different operation parameters. For example, the system 200 can include an oil pressure sensor and a temperature sensor. The health evaluation device 240 can transmit a first signal containing the oil pressure signal to elicit a shutdown response from the controller 210, and can transmit a second signal containing the temperature signal to issue an alert or power reduction response from the controller 210. In such cases, the first signal may contain at least two mutually-exclusive fault codes associated with various oil pressure readings in engine 110, while the second signal may contain at least two mutually-exclusive fault codes associated with various temperature readings. Other embodiments are also considered.

In some other embodiments, the system 200 includes more than one health evaluation device 240, which can be coupled to one or more health instruments 230, and which can transmit signals to the controller 210 containing the signals of those of one or more different engine instruments 220. In one example, multiple health evaluation devices 240 are each associated with respective health instruments 230, and are each configured for transmitting signals to the controller 210 to contain the signal from different engine instruments 220. In another example, multiple health evaluation devices 240 are coupled to one or more shared health instrument 230, and are each configured for transmitting signals to the controller to contain the signal from different engine instruments 220. In some instances, the health instrument 230 for a first health evaluation device 240 is a second, different health evaluation device 240, such that the output of second health evaluation device 240 is provided to the first health evaluation device 240 for monitoring. In a further example, multiple health evaluation devices 240 are configured for transmitting to the controller 210 signals associated with operation parameter of one or more common engine instruments 220. For instance, a first health evaluation device 240 transmits a signal containing two mutually-exclusive fault codes associated with an operation parameter of an engine instrument 220 that triggers a warning by the controller 210, and a second health evaluation device 240 transmits a signal containing two mutually-exclusive fault codes associated with an operation parameter of the same engine instrument 220, which triggers an engine shutdown by the controller 210.

In some embodiments, the wirelessly transmitted signal from the health evaluation device 240 modifies, rather than replaces, a signal issued by the engine instrument 220 to produce the predetermined value for the operation parameter. For example, if the engine instrument 220 provides the operation parameter to the controller 210 via an analog signal, the signal transmitted by the health evaluation device 240 is shaped to interfere with the signal issued by the engine instrument 220 so that it contains the at least two mutually-exclusive fault codes associated with the operation parameter. The wireless receiver 212 may be operatively coupled to the controller 210 in such a way that the received signal from the health evaluation device 240 may modify or replace a signal received from the engine instrument 220 without requiring any additional modifications to the controller 210.

In some other embodiments, the wirelessly-transmitted signal includes a priority flag or other indication which causes the wirelessly-transmitted signal to supersede the operation parameter signal as provided by the engine instrument 220. For example, if the engine instrument 220 issues the operation parameter signal as a digital signal which includes a priority bit (e.g., set to '0' for low priority, and set to '1' for high priority), the signal wirelessly-transmitted by the health evaluation device 240 has its priority bit set to high priority, to indicate that the wirelessly-transmitted signal should supersede the operation parameter signal provided by the engine instrument 220.

In some embodiments, the health evaluation device 240 is composed of a variety of circuit elements, including basic circuit elements, amplifiers, filters, transistors, other logic components, and the like. In some other embodiments, the health evaluation device 240 is composed of a microcontroller and/or other logic-based circuit elements. In some further embodiments, the health evaluation device 240 is composed of one or more computing devices which execute software for obtaining the health parameter from the health instrument 230, comparing the health parameter to the health threshold, and for wirelessly transmitting the signal to the controller 210, for instance via wireless transmitter 242.

In some embodiments, the health instrument 230 and the health evaluation device 240 are provided separately or jointly as an aftermarket addition to the system 200. For example, the engine 110 is operated in the context of an aircraft, which already includes the engine 110, the controller 210, the engine instrument 220, and the communication link 205. The health instrument 230 and the health evaluation device 240 are then added to the aircraft as a retrofit or as an upgrade, to provide the additional functionality to the controller 210 without necessitating a complete replacement or overhaul of the controller 210. For instance, the health evaluation device 240 and health instrument 230, along with any associated components such as power source 280, may be mounted within the engine 110. If not already present, a wireless receiver 212 may be operatively connected to the controller 210 for wireless communication with the health evaluation device 240. An input side of the health evaluation device 240 can thus be connected to the health evaluation device 230, and an output side of the health evaluation device 240 can include the wireless transmitter 242 for wireless connection to the wireless receiver 212 at the controller 210.

In some other embodiments, the health instrument 230 may already be part of the system 200 when the health evaluation device 240 is added to the aircraft or other system. For example, the health instrument 230 may already be coupled to the controller 210, for instance via an additional communication link, but the controller 210 may not be configured for monitoring the data from the health instrument 230 to produce certain health responses. The health evaluation device 240 can be used to monitor the data produced by the health instrument 230, and to wirelessly transmit a signal to the controller to produce an operation parameter signal for the engine instrument 220 in order to produce a desired health response from the controller 210.

In some embodiments, the response elicited from the controller 210 involves issuing an alert to an operator of the engine 110. For instance, the alert indicates to the operator that one or more steps should be taken to address the health issue identified by the health evaluation device 240. Such alert may include indication via the indicator 250, as discussed above. The health evaluation device 240 can continue to monitor the health parameter provided by the health instrument 230, and if the health parameter indicates that the health issue has been addressed, either by action of the operator or otherwise, for instance via activation of the reset switch 270, the health evaluation device 240 can stop wirelessly transmitting the signal to the controller 210.

Figure 3:
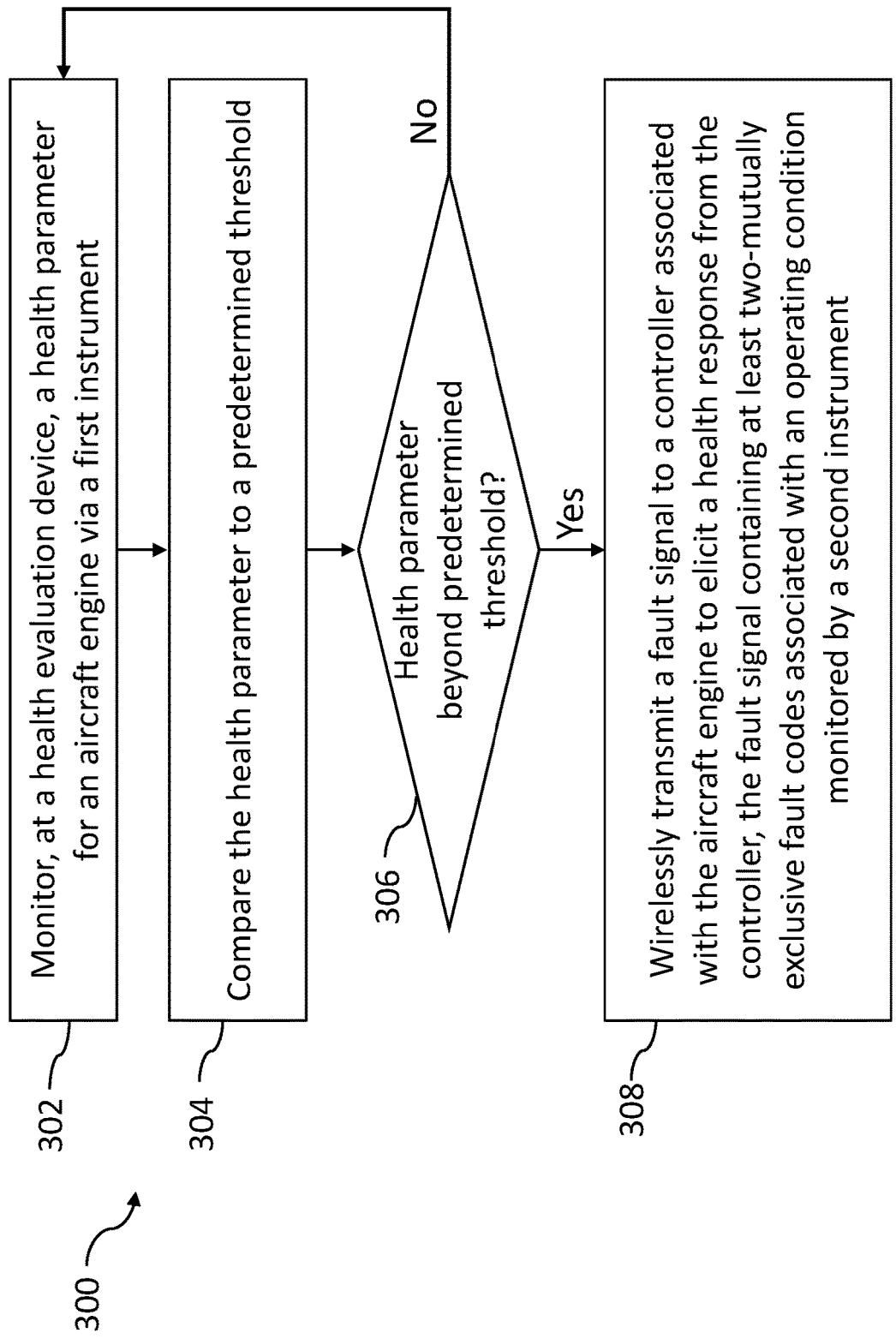
FIG. 3 is a flowchart illustrating an example method for monitoring the health of an aircraft engine.

With reference to FIG. 3, there is illustrated a flowchart for a method 300 for operating an aircraft engine, for instance the engine 110. In some embodiments, the operating consists in, or includes, monitoring the health of the engine 110. The engine 110 can be provided with a controller, for instance the controller 210, which can receive information via a communication link, for instance the communication link 205. The controller 210 may further receive information wirelessly, for instance via wireless receiver 212. At step 302, a health parameter is monitored at a health evaluation device, for instance the health evaluation device 240. The health parameter can be obtained via a first instrument, for instance the health instrument 230, and can be monitored at any suitable frequency. For example, the health instrument 230 can be a vibration sensor, and the health evaluation device 240 can monitor a vibration level for the engine.

At step 304, the health parameter is compared to a predetermined threshold, for instance a health threshold associated with the health parameter and/or the health instrument 230. The predetermined threshold may be inputted into the health evaluation device 240 and altered based on a variety of circumstances, as discussed above.

At decision step 306, a determination is made regarding whether the health parameter reaches (or exceeds) the predetermined health threshold. When the health parameter has not reached or exceeded the predetermined health threshold, the health evaluation device 240 does not take any further action and the method 300 moves to some previous step, for instance step 302. When the health parameter has reached or exceeded the predetermined health threshold, the method 300 moves to step 308.

At step 308, if the determination is made at previous step 306 that the health parameter has reached (or exceeded) the predetermined health threshold, a fault signal is wirelessly transmitted from the health evaluation device 240 to the controller 210, for instance via a wireless transmitter 242. The wirelessly-transmitted fault signal is operable to elicit a health response from the controller 210. The wirelessly-transmitted fault signal contains at least two mutually-exclusive fault codes associated with an operating condition monitored by a second instrument, for instance engine instrument 220. For example, the health response can include issuing an alert to an operator of the engine 110, causing shutdown of the engine 110, altering the operating conditions of the engine 110, for instance reducing a fuel flow to the engine, or the like.

In some embodiments, the method 300 may further include adjusting the predetermined threshold based on at least one of an overall health status of the aircraft engine 110, an age of the aircraft engine 110, and an environmental condition affecting the performance of the aircraft engine 110.

In some embodiments, the method 300 may further include detecting activation of a lockout switch 260 associated with the health evaluation device 240, and omitting the wireless transmitting of the signal from the health evaluation device 240 to the controller 210 despite, at step 306, determining that the health parameter has reached or exceeded the predetermined threshold.

In some embodiments, the method 300 may further include activating an indicator 250 indicative of the health parameter reaching the predetermined threshold.

In some embodiments, the wirelessly-transmitted signal alters the operation parameter signal provided by the engine instrument 220. In some other embodiments, the wirelessly-transmitted signal replaces the operation parameter signal provided by the engine instrument 220, or supersedes it, for instance based on a priority bit or other marker.

It should be understood that at step 302, the health evaluation device 240 can monitor multiple health parameters, for instance from one or more first instruments 230. In addition, it should be understood that at step 304, the health parameter can be compared to multiple health thresholds, and/or that multiple health parameters can each be compared to one or more health thresholds, as appropriate. In cases where multiple health thresholds are considered, or where multiple health parameters are monitored, the health evaluation device 240 can select one of a plurality of signals to wirelessly transmit to the controller 210.

In an exemplary embodiment where the health instrument 230 is configured for monitoring engine vibrations, the health evaluation device 240, or EVMU in this case, may be configured to operate in two distinct modes: a low vibration mode and a high vibration mode. The initial determination between low and high vibration modes may be made via method 300, and more particularly at step 306 where it is determined if the vibrations being monitored by the health instrument 230 have reached (or exceeded) a predetermined threshold. If no, then the EVMU 240 operates in the low vibration mode, and does not communicate with the controller 210. If yes, then the EVMU 240 operates in the high vibration mode, and proceeds as per method step 308. In cases where a lockout switch 260 is present and engaged, then the EVMU 240 operates in the low vibration mode despite the vibrations being monitored by the health instrument 230 having reached (or exceeded) a predetermined threshold. In other words, an engaged lockout switch 260 may prevent the high vibration mode from latching or activating regardless of the vibration levels detected by the health instrument 230. The EVMU 240 may include a latching switch that may latch in either the low vibration mode and high vibration mode. Other mode-varying means may be contemplated. The EVMU in the high vibration mode may be unlatched or reset into the low vibration mode via the optional reset switch 270.

Once the EVMU 240 has latched into (or otherwise engaged in) the high vibration mode, the EVMU may wirelessly transmit a signal to the controller 210 containing at least two mutually-exclusive fault codes associated with the operation parameter to elicit a health response, as per step 308 of method 300. If the indicator 250 is present, the EVMU 240 may additionally cause the indicator 250 to activate, i.e., to display a visual, auditory or other indication pertaining to the detected high vibrations.

The above-described low and high modes and latching may be applicable to other health evaluation devices 240 configured for receiving signals from health instruments 230 other than vibration sensors.

In an exemplary embodiment, the engine instrument 220 is a dual oil pressure sensor (DOPS) with two Wheatstone bridges operable to measure upstream and downstream pressures at a given location in the engine 110. For instance, under normal operating conditions, the DOPS 220 is configured for sending two signals, for instance relating to high-pressure compressor delivery pressure (P3) and combustor outlet pressure (P4), to the controller 210 through the communication link 205. Due to the nature of the DOPS 220, only one of these signals would ever indicate a fault, for instance a high delta pressure, at once. If the health parameter monitored by the health instrument 230, for instance engine vibrations monitored by an accelerometer, reaches a predetermined threshold, the health evaluation device 240 may be configured for wireless transmitting a signal to the controller 210, for instance via wireless transmitter 242, to intercept or block the two signals from the DOPS 220 at the controller 210 and modify or replace them with two signals indicating faults at both the upstream and downstream location. As this situation would not occur under normal operating conditions, the pilot (or other operator) would understand that the health issue being flagged, and the health response being elicited, originates from the health instrument 230 rather than from the DOPS 220. Other engine instruments 220 capable of triggering mutually-exclusive fault codes may be contemplated. For example, the engine instrument 220 may be a temperature sensor, and the health evaluation device 240 may wirelessly transmit a signal to the controller 210 containing both a high temperature warning and a low temperature warning, two mutually-exclusive fault codes, when the health instrument 230 detects a health parameter reaching a predetermined threshold.

Figure 4:
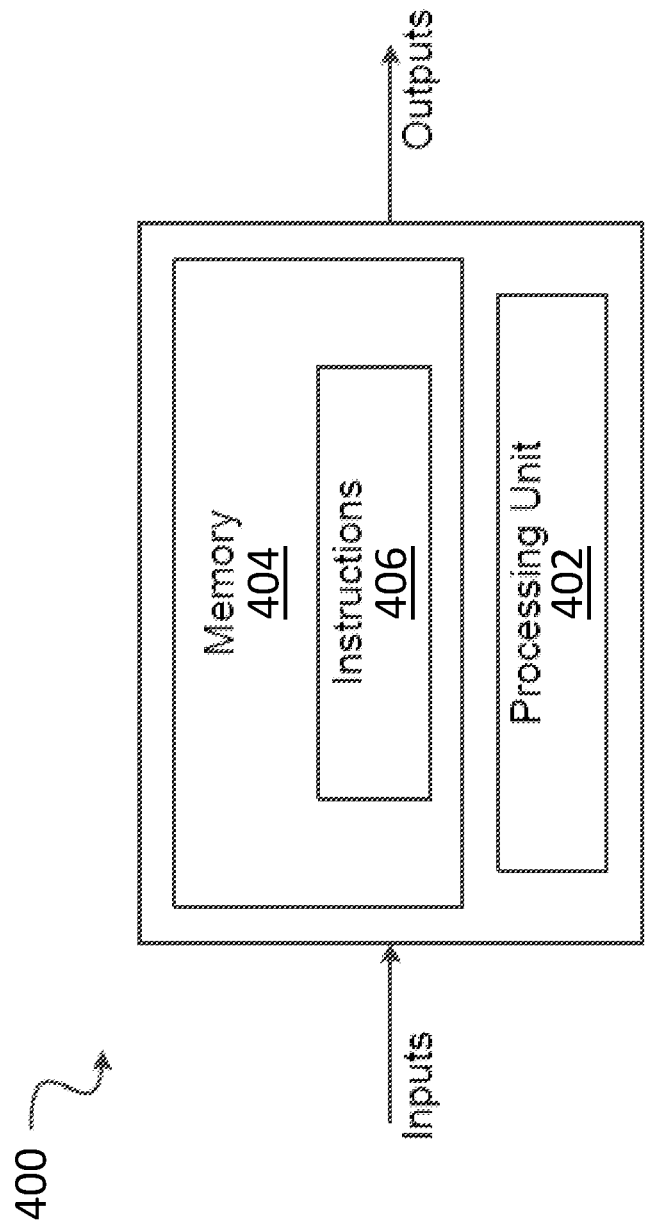
FIG. 4 is a block diagram of an example computing system for implementing the method of FIG. 3.

With reference to FIG. 4, in some embodiments, the method 300 may be implemented using a computing device 400 comprising a processing unit 402 and a memory 404 which has stored therein computer-executable instructions 406. The processing unit 402 may comprise any suitable devices configured to implement the system such that instructions 406, when executed by the computing device 400 or other programmable apparatus, may cause the functions/acts/steps of the method 300 as described herein to be executed. The processing unit 402 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, other suitable processing systems or circuits, or any combination thereof.

The memory 404 may comprise any suitable known or other machine-readable storage medium. The memory 404 may comprise non-transitory computer readable storage medium, for example, but not limited to, an electronic, magnetic, optical, electromagnetic, infrared, or semiconductor system, apparatus, or device, or any suitable combination of the foregoing. The memory 404 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 404 may comprise any storage means (e.g., devices) suitable for retrievably storing machine-readable instructions 406 executable by processing unit 402. In some embodiments, the computing device 400 can be implemented as part of a full-authority digital engine controls (FADEC) or other similar device, including electronic engine control (EEC), engine control unit (ECU), and the like.

The methods and systems described herein may be implemented in a high level procedural or object oriented programming or scripting language, or a combination thereof, to communicate with or assist in the operation of a computer system, for example the computing device 400. Alternatively, the methods and systems may be implemented in assembly or machine language. The language may be a compiled or interpreted language. Program code for implementing the methods and systems for detection may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems may also be considered to be implemented by way of a non-transitory computer-readable storage medium having a computer program stored thereon. The computer program may comprise computer-readable instructions which cause a computer, or in some embodiments the processing unit 402 of the computing device 400, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for operating an aircraft engine, comprising:
monitoring, by a health evaluation device, a health parameter for the aircraft engine, the health parameter received from a first instrument;
comparing, by the health evaluation device, the health parameter to a predetermined threshold;
when the health parameter reaches the predetermined threshold, wirelessly transmitting a fault signal from the health evaluation device to a controller associated with the aircraft engine to elicit a health response from the controller, the fault signal containing at least two mutually-exclusive fault codes associated with an operating condition of the aircraft engine monitored by a second instrument.

2. The method as defined in claim 1, further comprising adjusting the predetermined threshold based on at least one of an overall health status of the aircraft engine, an age of the aircraft engine, and an environmental condition affecting a performance of the aircraft engine.

3. The method as defined in claim 1, further comprising, when the health parameter reaches the predetermined threshold:
detecting activation of a lockout switch associated with the health evaluation device; and
omitting the wirelessly transmitting of the signal from the health evaluation device to a controller despite the health parameter reaching the predetermined threshold.

4. The method as defined in claim 1, wherein the monitoring the health parameter includes monitoring a level of vibration experienced by the aircraft engine.

5. The method as defined in claim 1, further comprising activating a visual indicator indicative of the health parameter reaching the predetermined threshold.

6. The method as defined in claim 1, wherein the operation parameter signal is received at the controller from the second instrument, and further wherein the fault signal causes the controller to one of modify the operation parameter signal or replace the operation parameter signal with a newly generated signal.

7. The method as defined in claim 1, wherein the fault signal is wirelessly transmitted from the health evaluation device to the controller until a reset switch associated with health evaluation device is activated.

8. The method as defined in claim 1, wherein the fault signal wirelessly transmitted from the health evaluation device to the controller contains the at least two mutually-exclusive fault codes associated with at least one of high or low oil pressure readings, high or low oil level readings, high or low fuel pressure readings, high or low fuel temperature readings, high or low air pressure readings, and chip detection readings.

9. The method as defined in claim 8, wherein the fault signal wirelessly transmitted from the health evaluation device to the controller contains a first fault code and a second fault code, the first fault code indicative of a high delta pressure at a first location upstream of an oil filter of the aircraft engine and a second fault code indicative of a high delta pressure at a second location downstream of the oil filter.

10. The method as defined in claim 1, wherein the wirelessly transmitting the fault signal comprises selecting the at least two mutually-exclusive fault codes from a group of two or more sets of at least two mutually-exclusive fault codes.

11. A system for operating an aircraft engine, comprising:
a first instrument coupled to the aircraft engine and operable to monitor a health parameter of the aircraft engine;
a second instrument coupled to the aircraft engine and operable to generate an operation parameter signal indicative of an operating condition of the aircraft engine;
a communication link coupling the second instrument to a controller associated with the aircraft engine to provide the operation parameter signal to the controller; and
a health evaluation device communicatively coupled to the first instrument and to the controller, the health evaluation device operable, in response to detecting that the health parameter reaches a predetermined threshold, to wirelessly transmit a fault signal to the controller to elicit a health response from the controller, the fault signal containing at least two mutually-exclusive fault codes associated with the operation condition.

12. The system as defined in claim 11, wherein the predetermined threshold is adjustable based on at least one of an overall health status of the aircraft engine, an age of the aircraft engine, and an environmental condition affecting the performance of the aircraft engine.

13. The system as defined in claim 11, wherein the health evaluation device includes a lockout switch operable to, when activated, omit wirelessly transmitting the signal from the health evaluation device to the controller despite the health parameter reaching the predetermined threshold.

14. The system as defined in claim 11, wherein the first instrument is an accelerometer operable to monitor a level of vibration experienced by the aircraft engine.

15. The system as defined in claim 11, further comprising a visual indicator operable to activate upon the health parameter reaching the predetermined threshold.

16. The system as defined in claim 11, wherein the operation parameter signal is received at the controller from the second instrument, and further wherein the fault signal causes the controller to one of modify the operation parameter signal or replace the operation parameter signal with a newly generated signal.

17. The system as defined in claim 11, wherein the second instrument is one of a pressure sensor, a fluid sensor, a temperature sensor, a speed sensor, an oil level sensor and a chip detector.

18. The system as defined in claim 11, further comprising a reset switch associated with the health evaluation device, wherein the fault signal is wirelessly transmitted to the controller until the reset switch is activated.

19. The system as defined in claim 11, wherein the second instrument is a pressure sensor and the health evaluation device is operable to wirelessly transmit the fault signal containing the at least two mutually-exclusive fault codes associated with at least one of high or low oil pressure readings and high or low fuel pressure readings.

20. The system as defined in claim 19, wherein the health evaluation device is operable to wirelessly transmit the fault signal containing a first fault code and a second fault code, the first fault code indicative of a high delta pressure at a first location upstream of an oil filter of the aircraft engine and the second fault code indicative of a high delta pressure at a second location downstream of the oil filter.

* * * * *